United States Patent
Scott et al.

[11] 3,817,119
[45] June 18, 1974

[54] PROTECTIVE COVER FOR MOTOR VEHICLE GEAR SHIFT ASSEMBLY LEVER

[76] Inventors: David Evarts Scott; Rae Nell Scott, both of 1580 Skylark Way, Chula Vista, Calif. 92011

[22] Filed: Dec. 26, 1972

[21] Appl. No.: 318,607

[52] U.S. Cl. ................................................. 74/563
[51] Int. Cl. ............................................. G05g 1/16
[58] Field of Search ........................... 74/563, 558.5

[56] References Cited
UNITED STATES PATENTS
1,370,730  3/1921  Carver .................................. 74/563
1,600,010  9/1926  Peace ................................. 74/563 X
2,776,582  1/1957  Blades ................................. 74/563
3,722,320  3/1973  Wilfert ............................. 74/563 X

*Primary Examiner*—Samuel Scott
*Assistant Examiner*—F. D. Shoemaker
*Attorney, Agent, or Firm*—James J. Brown, Esq.

[57] ABSTRACT

A protective cover is provided for foot-operated gear shift levers of motorbikes, motorcycles, motorscooters and like vehicles. The cover consists of a tubular sheath of soft, pliable resilient woven or knit material which is open at one end and tapered to complete closure at the other end. The upper surface of the tubular sheath is fitted with a reinforcing patch of heavier, non-porous material.

4 Claims, 7 Drawing Figures

PATENTED JUN 18 1974

PROTECTIVE COVER FOR MOTOR VEHICLE GEAR SHIFT ASSEMBLY LEVER

BACKGROUND OF THE INVENTION

The gear shift levers of motor vehicles such as motorcycles, motorbikes and motorscooters are most normally designed for foot operation so as to leave the hands of the operator of such a vehicle free to control the steering and throttle mechanisms. As a result, the gear shift levers of these type vehicles which may be mounted on either the left or right hand side of the vehicle normally extend from the vehicle's gear case and are positioned forward of and in line with the normal foot position of the operator. The gear shift levers must be both raised and lowered to achieve proper operational gearing, thus requiring the operator of such a vehicle to use the upper finished portion of the toe of his footwear to shift the lever downward. The portions of the gear shift levers that come in contact with the operator's footwear during shifting operations are normally constructed of hard, wear-resistant materials and quickly mar, scuff and abrade the finished upper surface of the operator's footwear, thus producing constant aggravations to the operators of such vehicles as well as expense for footwear repair and replacement. The current invention provides an inexpensive device that may be quickly and easily installed on foot-operated gear shift levers of motorcycles, motorbikes, motorscooters and the like that will allow operators of such vehicles to shift the gears with the upper finished surface of their footwear without incurring damage, marring, abrading or scuffing thereto. This feature is particularly important to the numerous operators of motorbikes, motorcycles, motorscooters and the like, such as policemen, servicemen and women, businessmen and women, highway patrolmen, members of motorbike groups and others of the motoring public who have definite requirements as well as personal desire to maintain a high gloss or neat finish on the toe of their footwear.

SUMMARY OF THE INVENTION

This invention relates to a new and unique covering device for that portion of foot-operated gear shift levers of motorcycles, motorscooters, motorbikes and like vehicles that come in contact with the upper surface of the operator's footwear during gear shifting operations. An important object of this invention is to provide a cover for foot-operated gear shift levers of motorcycles, motorbikes, motorscooters and like vehicles to prevent the upper surface of the shoe or other footwear of the operator from becoming scratched, marred, buffed, abraded or damaged. Another object of this invention is to conceal the general unsightliness of foot-operated gear shift levers of motorcycles, motorbikes, motorscooters and like vehicles by providing an attractive and utilitarian cover. A further object of the present invention is to provide an inexpensive cover for the foot-operated gear shift levers of motorcycles, motorbikes, motorscooters and like vehicles that can be readily and easily installed and removed. Yet another object of the present invention is to provide a cover for foot-operated gear shift levers of motorcycles, motorbikes, motorscooters and like vehicles that is readily and easily adaptable for use on foot-operated gear shift levers installed on either the right or left hand side of motorcycles, motorbikes, motorscooters and like vehicles.

These and other objects are accomplished according to the present invention which comprises a single cylindrical tube having a circular opening on one end and tapered to complete closure on the other end and being constructed of pliable, soft and resilient material with or without a reinforcing patch on one side to reduce wear. The resilience of the basic construction material allows stretching and contracting of the tube on the side opposite the reinforcing patch and thereby strict conformance and adherance of the tube to the various shapes, angles and diameters of the various styles of gear shift levers used on motorcycles, motorbikes, motorscooters and like motor vehicles.

Other objects and many of the attendant advantages of this invention will be readily appreciated as the same becomes better understood by reference to the following detailed descriptions when considered in connection with the accompanying drawings, wherein.

Figure 1:
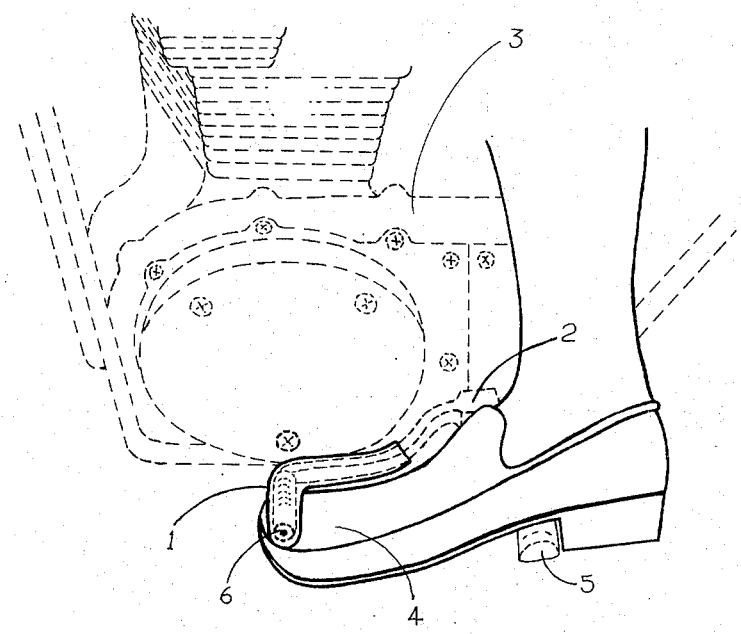
FIG. 1 is a perspective view showing a preferred embodiment of the current invention installed on a motorbike foot-operated gear shift lever.

In the drawings wherein for the purpose of illustration is shown a preferred embodiment of the invention and wherein similar reference characters designate corresponding parts throughout the several views, the completed cover is designated 1 and the gear shift lever of the vehicle 2.

As shown in FIG. 1 there is a motorbike gear casing 3 possessing a protruding foot-operated gear shift lever 2 upon which a preferred embodiment of the current invention, generally designated by the numeral 1, has been installed to protect the upper toe portion 4 of the operator's footwear. The numeral 5 designates a type of foot rest commonly employed in two wheel motor vehicles.

Figure 2:
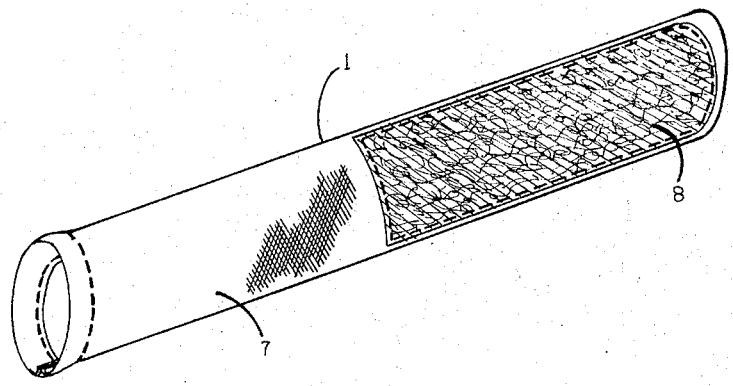
FIG. 2 is a perspective view of the current invention.
Figure 3:
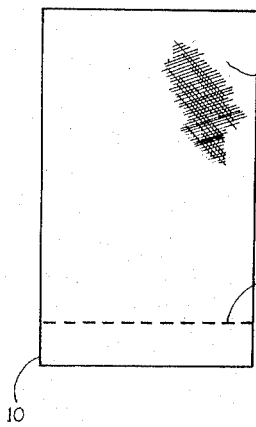
FIG. 3 is a plan view of the basic rectangle from which the cover is constructed.
Figure 4:
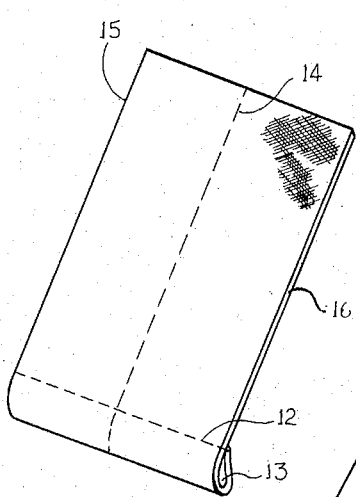
FIG. 4 is a perspective view of the basic material rectangle from which the cover is constructed showing the base hem.

FIGS. 1 – 2. The cover 1 includes a body or major cover portion 7 which is of resilient material such as nylon knit, cotton knit, or for that matter any type of organic or synthetic material, natural or manmade fiber, that possesses resilience and a reinforcing patch 8 of a heavier and non-pourous material such as leather, artificial leather, plastic or the like. The reinforcing patch 8 conforms to the general shape of the body of the cover 7, however, it may be of various longitudinal lengths.

Figure 5:
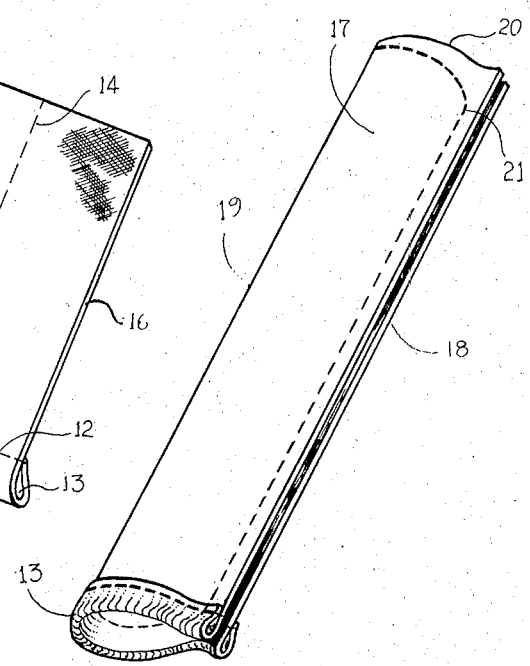
FIG. 5 is a perspective view of the material rectangle from which the cover is constructed showing the base and longitudinal hems.
Figure 6:
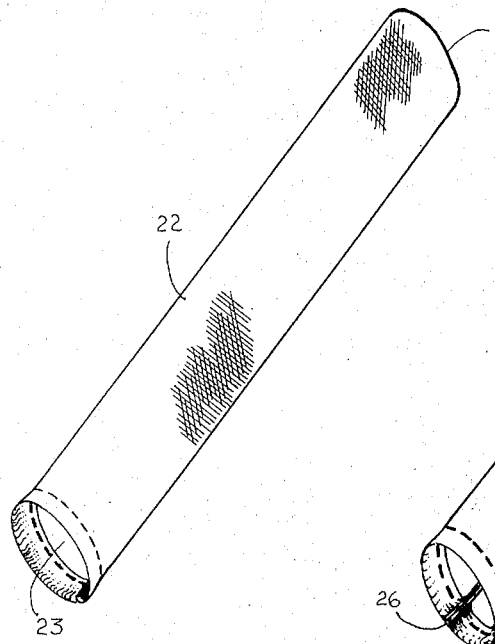
FIG. 6 is a perspective view of the cover after it has been turned inside out.
Figure 7:
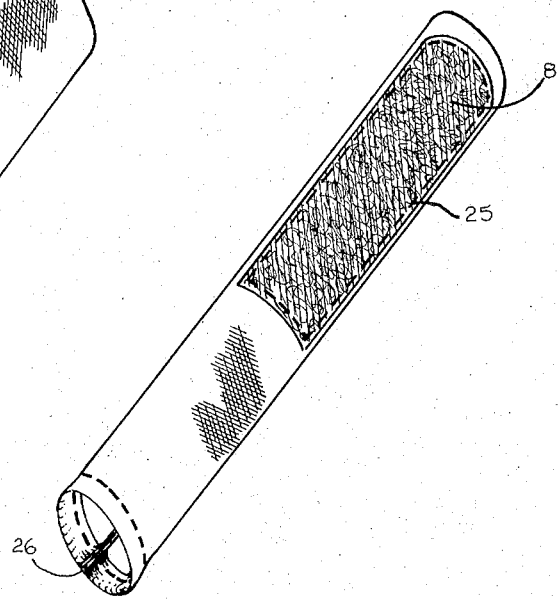
FIG. 7 is a perspective view of the cover with a reinforcing patch installed.

FIGS. 3 – 6. The basic cover is constructed from a single rectangle 9 of pliable soft and resilient material. The base of the rectangle 10 is doubled over, substantially upon the dotted line 11 and secured in any approved manner to itself, as by stitches 12, to provide a hem 13. The hemmed rectangle is then folded substantially upon the dotted line 14 in such a manner that the left edge 15 lies precisely upon the right edge 16 and thus effectively producing a rectangle 17 one half the width of the original rectangle 9 possessing two material layers and having one open side, the right side 18, and one continuous side, the left side 19, with a continuous hem 13 on its base. The layers of the rectangle are then secured on their topside 20 and the open right side 18 by any approved manner, substantially along dotted line 21, as by stitches, thus providing a rectangular cover secured on three sides and possessing a hemmed opening at its base. The rectangular cover shown in FIG. 5 is then turned inside out. This inversion causes the rectangular cover to assume an elliptical tube shape 22 as shown in FIG. 6 possessing a resilient elliptical opening 23 at its base and a tapered closure 24 at its upper extremity. A reinforcing patch 8 of suitable material is now secured to the cover by any approved method, such as stitching 25, on the side opposite the cover's longitudinal seam 26, to protect the soft, resilient and pliable material of the cover from damage by the rough lower surface of the operator's footwear during gearing operations in which the gear shift lever must be depressed.

FIGS. 1–7. The cover 1 may be readily slipped over the outer end 6 of the gear shift lever 2 since the resilient elliptical opening of the cover 23 as well as the body of the cover 7 may be stretched considerably for installation, and upon release, the resilient elliptical opening 23 and the body of the cover 7 due to the resiliency of the material from which the cover is made will close around the circumference of the shaft of the foot-operated gear shift lever 2 encircling and conforming to the shape of the gear shift lever and firmly holding the reinforcing patch 8 of the cover in such a position as it may be placed for optimum use. Thus installed, the vehicle's operator may raise the gear shift lever with the toe of his footwear without incurring marring, scuffing, abrasion or damage thereto because the soft, pliable and resilient material prevents contact with the hard, wear-resistant material of the gear shift lever.

In addition to being fabricated as heretofore described, the cover of the present invention can also be advantageously formed by being knit or weaved as a single seamless sheath of soft, pliable and resilient material having an opening at one end and tapered to complete closure at the other end with reinforcement on its upper surface.

Various other changes may also be made to the form of the invention herein shown and described without departing from the spirit of the invention or scope of the claims.

Having described this invention, what I assert as new and pray issuance of letters of patent for, is:

1. A cover for foot-operated gear shift levers of motorbikes, motorcycles, motorscooters and like vehicles comprising tubular sheath of soft, pliable and resilient knit or woven material with an opening on one end and tapered to complete closure on the other end and fitted on its upper surface with a reinforcing patch of heavier and non-pourous material.

2. The cover of claim 1 wherein said sheath is constructed of pliable, resilient material so that it can be stretched to achieve installation on foot-operated gear shift levers and whereupon being stretched and slipped over a foot-operated gear shift lever and thence released will contract and thereby exhibit strict conformance and adherance to the various shapes, angles and diameters of the foot-operated gear shift lever on which it is installed.

3. The cover of claim 1 wherein said tubular sheath has a single seam running substantially its length and a single hem at its open end.

4. The cover of claim 1 wherein said tubular sheath is seamless.

* * * * *